United States Patent Office
2,972,601
Patented Feb. 21, 1961

2,972,601
LOW-VISCOSITY A-STAGE ACROLEIN-PENTAERYTHRITOL RESINS

Howard R. Guest, Charleston, Ben W. Kiff, Ona, and Calvert B. Halstead, St. Albans, W. Va., assignors to Union Carbide Corporation, a corporation of New York No Drawing. Filed Aug. 9, 1957, Ser. No. 677,216

14 Claims. (Cl. 260—67)

The subjects of this invention are a novel process for making resins from pentaerythritol and alpha,beta-unsaturated aldehydes, and novel low viscosity resinous compositions produced by this process. More specifically this invention relates to the formation of liquid resins from pentaerythritol and alpha,beta-unsaturated aldehydes which are suitable for curing to solid plastics by using certain acid-treated clays as the catalyst. These catalysts may be removed from the liquid reaction mixture by filtration whereupon the liquid resin may be stored and transported prior to curing with another acid. Furthermore, the use of these catalysts makes possible the production of a liquid pentaerythritol-unsaturated aldehyde resin of unusually low viscosity. Such resins are suitable for making laminates and molded articles where a large amount of filler is desirable. In such cases a thin liquid is preferable due to its better wetting properties and ease of application.

At present two methods are known for carrying out the polymer formation of alpha,beta-unsaturated aldehydes and pentaerythritol.

According to one method, the reaction is carried out by first forming and isolating the unsaturated spirobi (m-dioxane) resulting from the reaction of an alpha,beta-unsaturated aldehyde and pentaerythritol. These unsaturated spirobi compounds enter into resinification reactions with polyhydric alcohols in the presence of acidic catalysts.

The practice of the second method of polymer formation with alpha,beta-unsaturated aldehydes and pentaerythritol involves the formation of a liquid precondensate by reacting the aldehyde and pentaerythritol in reciprocal proportion to the number of reactive positions of each compound. The preferred compounds of this reaction are produced by reacting pentaerythritol with alpha,beta-unsaturated aldehydes having less than eight carbon atoms and their halogen substitution products. Some such aldehydes are acrolein, alpha-chloro-acrolein, alpha methyl-acrolein, alpha-ethylacrolein, alpha-phenylacrolein, alpha-ethoxyl acrolein, crotonaldehyde, alpha-chlorocrotonaldehyde, and alpha-methylcrotonaldehyde. Of these aldehydes acrolein is the most preferred. Pentaerythritol has a functionality of four as a polyhydric alcohol, and acrolein has a functionality of three, considering the reactivity of both the carbonyl group and the olefinic group. Thus the reactants should be charged in a ratio of 1.33 moles of acrolein to 1 mole of pentaerythritol. However, for practical purposes it has been found best to use a slight stoichiometric excess of acrolein such as 1.66 moles to 1 mole or even a larger excess of the acrolein per mole of pentaerythritol. The precondensate thus formed by reacting about three moles of pentaerythritol and about four moles of acrolein in the presence of an acid catalyst is a viscous liquid resin which slowly condenses to a solid plastic. This resinous liquid is known as the A-stage resin. However, for practical application, the condensation can be stopped by the neutralization of the acid catalyst. The liquid resin may then be stored or transported and subsequently cured to its desired solid form by the addition of an acid. Because of the multiplicity of functional groups and various combinations possible the A-stage material cannot be described by simple equations. Along with the more complex reaction products, which form the resinous portion of the liquid, appreciable quantities of the simple acetals are formed. Again, in the case of the reaction of pentaerythritol and acrolein the following acetals are formed:

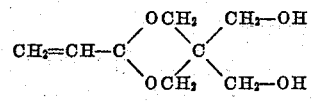

2-vinyl-1,3-dioxane 5,5-dimethanol; and

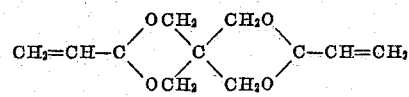

3,9-divinylspirobi (m-dioxane).

This invention is primarily concerned with the above second method for the production of resins. This method however, has two notable disadvantages. One disadvantage is that upon neutralization of the non-volatile acid catalyst in the A-stage undesirable materials are added to the resin. The second disadvantage is that it is difficult to control the viscosity of the resin and further A-stage resins of high viscosity are produced by the above methods.

It is an object of this invention to produce A-stage pentaerythritol alpha,beta-unsaturated aldehyde resins with an acid catalyst which may be easily removed from the resin by filtration and without the need of neutralization. It is a further object to produce A-stage pentaerythritol alpha,beta-unsaturated aldehyde resins with viscosities of less than 5,000 centipoises (at 25 degrees centigrade). It is a further object of this invention to provide an acid catalyst which is a good catalyst for the production of the A-stage resin but a poor catalyst for curing this resin to a solid polymer and further, a catalyst which permits easy control of the viscosity produced in the resin.

The above objects are attained by the use of certain acid-treated clays as catalysts. These clays are made by treating so-called sub-bentonite clays with acid. This type of clay is characterized by rapid slacking and only slight swelling when placed in water. Montmorillonite is the chief mineral in these bentonite clays. The base exchange positions are generally occupied by calcium and magnesium ions. The activated clays and particularly the sub-bentonite clays are described in the Encyclopedia of Chemical Technology, volume 4 (1949), pages 53–57. The process of acid treating and making the activated clay is described on page 55 of this encyclopedia. The process of making the clay consists essentially of mixing a clay which is susceptible to high acid activation such as the sub-bentonite clays with enough water to form a slurry to which a mineral acid (sulfuric or hydrochloric are preferred) amounting to about 35 percent by weight of the clay is added. The mixture is then treated with live steam for 5 to 6 hours. The treated clay is then washed with water until substantially free of acid. It is then dried and ground. A commercial product of the sub-bentonite activated clays which applicants have found as particularly useful is sold under the name of "Super Filtrol."

To illustrate the specific usefulness of the sub-bentonite clays for this purpose, two somewhat more inert materials were treated with the acid as described above. These were kaolin and the so-called "Molecular Sieves" which are synthetic zeolites. After the acid treatment neither of these retained enough acidity to be effective catalysts for the aldehyde-pentaerythritol reaction. This is shown in Experiments 1 and 2.

The acid activated sub-bentonite is a good catalyst for the preparation of the A-stage resin, but a slow polymerization catalyst. Therefore, the initial reaction can be prolonged to a much greater extent with the acid activated sub-bentonite than when other catalysts are used and thus give a more accurate control of viscosity. At the conclusion of the formation of the A-stage liquid, it is simply removed by filtration which is a further advantage. Also, viscosities of as little as 500 centipoises (at 25 degrees centigrade) may be produced by these methods whereas the conventional catalysts do not produce such low viscosities.

The alpha, beta-unsaturated aldehyde and pentaerythritol are mixed with the acid activated sub-bentonite and the mixture is stirred to keep the solid catalyst in suspension. The charge is then heated to reaction temperature and held at that point for the desired length of time. The mixture is then filtered to remove the catalyst and any unreacted pentaerythritol. Inert solvents may be used to facilitate the filtration. The solvent, unreacted aldehyde and water formed in the reaction are removed by vacuum distillation leaving the A-stage liquid. Such vacuum distillation is usually conducted in the range of 60–90 degrees centigrade at 1–10 millimeters of mercury pressure. This resin is completely neutral and can be stored indefinitely with no polymerization occurring and without any increase in viscosity. In fact it can be heated for several hours at temperatures as high as 150 degrees centigrade without any obvious curing taking place or any appreciable increase in viscosity. When it is desired to convert this material to the final polymer, a conventional curing catalyst is added and the mixture is heated.

The amount of acid-activated sub-bentonite required to catalyze the reaction may range from 0.5 percent to 20 percent by weight of the reactants. These limits are not critical but no particular advantage is seen in using a wider range. As mentioned above, the time of reaction is much longer than with other acidic catalysts. The time varies of course, with the amount of activated clay used. For instance, with 12.5 percent catalyst, the reaction time may be as short as one hour, whereas with 1 percent of the solid catalyst it may be necessary to react the mixture for 12 hours or longer to achieve a comparable degree of conversion.

The length of reaction is also influenced by the viscosity which is desired. When 9 percent "Super Filtrol" was used as catalyst and the reaction conducted for 1.5 hours, the viscosity of the product was 1440 centipoises at 25 degrees centigrade. With the same amount of catalyst and a reaction time of 3 hours the product had a viscosity of 5280 centipoises at 25 degrees centigrade. When 1.5 percent "Super Filtrol" was used as catalyst and the reaction was conducted for 2 hours, the viscosity of the product was 592 centipoises at 25 degrees centigrade, after 3 hours reaction time 619 centipoises, after 6 hours reaction time 1305 centipoises, and after 10 hours 2840 centipoises at 25 degrees centigrade.

A solvent may be added at the conclusion of the reaction before filtering out the catalyst in order to facilitate filtration but such a solvent is not necessary to carry out the process. However, because of the somewhat gelatinous nature of the catalyst there is an advantage in diluting the A-stage liquid prior to filtration. For this use any common organic solvent which will dissolve the resin, which will not react with it, and which boils in the proper range is suitable. Suitable solvents are benzene, tetrahydrofuran and various ethers, esters, and ketone solvents. The solvent should be one which boils low enough to be eliminated by the vacuum distillation.

After the filtration, the solvent, unreacted aldehyde, and water of reaction are removed by vacuum distillation. As has been mentioned, the A-stage liquid remaining is stable indefinitely and can be heated for a prolonged period without polymerizing or increasing in viscosity. This is a particularly valuable virtue since upon occasion it is desirable to heat A-stage resins above 150 degrees centigrade in order to remove the last traces of water so as to minimize the evolution of lacrymatory fumes during the subsequent curing of thin sheets of the resin. A-stage resins prepared using the acid activated sub-bentonite catalyst can be cured in the usual way with acid catalysts. Among these acid catalysts are sulfuric acid, toluenesulfonic acid, benzenesulfonic acid, mixed alkanesulfonic acids, boron trifluoride, aluminum trichloride, and diethyl sulfate. In applications of resins to low-cost laminates the A-stage material may be cured with one of the acid-curing catalysts without the prior removal of the clay and the water of reaction.

The reaction of the aldehyde and pentaerythritol in the presence of the activated clay commences at temperatures above 40° C. When the aldehyde is acrolein the preferred temperature is 70–80° C. Temperatures above 90° C. may be used in conjunction with above atmospheric pressures. To obtain polymers with the best physical properties it is desirable to cure at 100 degrees centigrade or higher.

EXAMPLE I

A charge of 535 grams of acrolein (97.2 percent pure), 760 grams pentaerythritol, and 128 grams of "Super Filtrol" was charged to a reaction flask equipped with stirrer, thermometer, and condenser. The amount of catalyst was 9 percent by weight of the total charge. The mixture was heated to reflux, and after enough of the acrolein had reacted to allow the kettle temperature to reach 75 degrees centigrade, the mixture was held at that point for 1.5 hours. The material was cooled to 55 degrees centigrade and a portion of the charge was removed. It was filtered to remove the catalyst and unreacted pentaerythritol. The filtrate was stripped of volatile material to a kettle temperature of 78 degrees centigrade at 4 millimeters of mercury pressure. The residual A-stage material had a viscosity of 1440 centipoises at 25 degrees centigrade. To this material was added 0.5 percent by weight of the resin of diethyl sulfate catalyst. After heating for a brief time at 70–75 degrees centigrade, it was poured into molds and cured for 16 hours at 100 degrees centigrade. A sample of the final polymer had these properties:

Heat distortion_____ 116 degrees centigrade.
Flexural modulus_____ 333,000 lbs. per square inch.
Hardness, "Durometer D"__ 85.
Impact, Izod, foot pounds per inch of notch_____ 0.26.

The remaining portion of the reaction mixture was reacted further until the total time was 3 hours. A sample of this was removed, filtered and stripped of volatiles to a kettle temperature of 78 degrees centigrade at 4 millimeters of mercury pressure. The A-stage resin had a viscosity of 5280 centipoises at 25 degrees centigrade. It was cured in the manner described above for 16 hours at 100 degrees centigrade with 0.5 percent diethyl sulfate. One sample had these properties:

Heat distortion_____ 102 degrees centigrade.
Flexural modulus_____ 369,000 lbs. per square inch.
Hardness, "Durometer D"__ 85.
Impact, Izod, foot pounds per inch of notch_____ 0.64.

The remaining portion of the charge was reacted further until the total time was 4.5 hours. After it was filtered and stripped of volatile matter to a kettle temperature of 80 degrees centigrade at 4 millimeters of mercury pressure it had a viscosity of 15,040 centipoises at 25 degrees centigrade. To this A-stage resin there was added 0.5 percent diethyl sulfate and it was cured at 100 degrees centigrade for 16 hours. A sample of the cured polymer had these properties:

Heat distortion_____ 88 degrees centigrade.
Flexural modulus_____ 379,000 lbs. per square inch.
Hardness, "Durometer D"__ 85.
Impact, Izod, foot pounds
 per inch of notch_____ 0.99.

EXAMPLE II

A charge of 535 grams of acrolein (97.2 percent pure), 760 grams of pentaerythritol, and 128 grams of an acid activated sub-bentonite was placed in the reactor described in Example I. The catalyst was 9 percent by weight of the charge. After reacting for 1.25 hours the mixture was cooled and filtered. The filtrate was stripped to a kettle temperature of 75 degrees centigrade at 4 millimeters of mercury pressure and had a viscosity of 1120 centipoises at 25 degrees centigrade.

To this material there was added 0.5 percent of diethyl sulfate catalyst and the mixture was poured into molds and cured for 20 hours at 100 degrees centigrade. Upon testing, a sample of the final polymer had these properties:

Heat distortion_____ 116 degrees centigrade.
Flexural modulus_____ 325,000 lbs. per square inch.
Hardness, "Durometer D"__ 85.
Impact, Izod, foot pounds
 per inch of notch_____ 0.53.

EXAMPLE III

A charge of 535 grams of acrolein (97.2 percent pure), 760 grams pentaerythritol and 128 grams of "Super Filtrol" (9 percent by weight of the total charge) was placed in the reactor described in Example I. The reaction was conducted at 75–80 degrees centigrade for 2 hours. At the conclusion of that time the product mixture was filtered to remove the catalyst and unreacted pentaerythritol. Volatile matter was then distilled off to a kettle temperature of 80 degrees centigrade at 4 millimeters of mercury pressure. The viscosity of the residue was 305 centipoises at 40 degrees centigrade.

To a 120-gram sample of this A-stage material was added 0.54 gram of diethyl sulfate (0.45 percent by weight). This material was poured into molds and cured at 100 degrees centigrade for 18 hours. One sample had these properties:

Heat distortion_____ 112 degrees centigrade.
Flexural modulus_____ 318,000 lbs. per square inch.
Hardness, "Durometer D"__ 85.
Impact, Izod, foot pounds
 per inch of notch_____ 0.34.

EXAMPLE IV

A charge of 1605 grams of acrolein (97.2 percent pure), 2,280 grams of pentaerythritol and 205 grams of "Super Filtrol" (5 percent based on the total charge) was placed in an apparatus similar to that described in Example I. The reaction was conducted at 75 to 81 degrees centigrade for 1.5 hours. After cooling there was then added 1030 grams (20 percent by weight) of benzene to facilitate filtration. The mixture was filtered to remove the catalyst and unreacted pentaerythritol. Volatile material was stripped off to a kettle temperature of 74 degrees centigrade at 4 millimeters of mercury pressure. The residual A-stage had a viscosity of 896 centipoises at 25 degrees centigrade.

To a portion of this material there was added 0.6 percent by weight of diethyl sulfate catalyst. It was poured into molds and cured at 100 degrees centigrade for 16 hours. One sample was tested and had these properties:

Heat distortion_____ 113 degrees centigrade.
Flexural modulus_____ 359,000 lbs. per square inch.
Hardness, "Durometer D"__ 84.
Impact, Izod, foot pounds
 per inch of notch_____ 0.2.

EXAMPLE V

A charge of 803 grams of acrolein (97.2 percent pure), 1140 grams of pentaerythritol, and 29 grams of "Super Filtrol" (1.5 percent by weight of the total charge) was placed in an apparatus similar to that of Example I. The mixture was heated at 75 degrees centigrade for two hours. A portion (245 grams) was then removed, diluted with benzene, and filtered. Volatile matter was distilled off to a kettle temperature of 78 degrees centigrade at 4 millimeters of mercury pressure. The residue had a viscosity of 592 centipoises at 25 degrees centigrade. To this was added 0.3 percent by weight of a mixed alkanesulfonic acid catalyst and the resin was poured into molds and cured for 16 hours. One sample had these properties:

Heat distortion _____ 106 degrees centigrade.
Flexural modulus _____ 329,000 per square inch.
Hardness "Durometer D" _____ 85.
Impact, Izod, foot pounds per
 inch of notch _____ 0.19.

The remaining portion of the reaction mixture was heated for an additional hour at 75 degrees centigrade. It was diluted with benzene and filtered. The volatile matter was distilled off and the resulting A-stage had a viscosity of 619 centipoises at 25 degrees centigrade. To this material there was added 0.3 percent by weight of alkanesulfonic acid and it was cured at 100 degrees centigrade for 16 hours. One sample had these properties:

Heat distortion _____ 109 degrees centigrade.
Flexural modulus _____ 297,000 pounds per square inch.
Hardness "Durometer D" __ 85.
Impact, Izod, foot pounds per
 inch of notch _____ 0.2.

EXAMPLE VII

A charge of 1672 grams of acrolein (97.2 percent pure), 2380 grams of pentaerythritol and 41 grams of "Super Filtrol" (1 percent based on the total charge) was charged to an apparatus similar to that described in Example I. The mixture was reacted for 12 hours at 75–80 degrees centigrade. It was then diluted with benzene and filtered. The volatile material was then distilled off to a kettle temperature of 75 degrees centigrade at 5 millimeters of mercury pressure. The A-stage resin had a viscosity of 3,340 centipoises at 25 degrees centigrade. To a portion of the material there was added 0.3 percent alkenesulfonic acid by weight of the resin and it was cured at 100 degrees centigrade for 16 hours. A sample of the final polymer had these properties:

Heat distortion _____ 110 degrees centigrade.
Flexural modulus _____ 318,000 pounds per square inch.
Hardness "Durometer D" __ 85.
Impact, Izod, foot pounds per
 inch of notch _____ 0.6.

EXAMPLE VIII

A charge of 1672 grams of acrolein (97.2 percent pure), 2380 grams of pentaerythritol, and 62 grams of "Super Filtrol" (1.5 percent by weight of the total charge) was placed in an apparatus similar to those used in the preceding examples. The mixture was heated for 10 hours at 75 to 80 degrees centigrade. It was then cooled, diluted with benzene and filtered. After distilling off volatile material to a kettle temperature of 78 degrees centigrade at 5 millimeters of mercury pressure, 0.3 percent by weight of an alkanesulfonic acid was added and the material was cured at 100 degrees centigrade for 16 hours. A sample of the final polymer had these properties:

Heat Distortion _____ 109 degrees centigrade.
Flexural modulus _____ 310,000 pounds per square inch.
Hardness "Durometer D" __ 85.
Impact, Izod, foot pounds per inch of notch _____ 0.4.

Experiment 1

This experiment describes an attempt to make an active catalyst by acid-treating kaolin. A charge of 100 grams of kaolin, 150 cc. of water and 35 grams of concentrated sulfuric acid was placed in a reaction flask. Steam was sparged into the mixture for 6 hours. The kaolin was filtered from the mixture and washed with distilled water until the wash water had a pH of 4.5. The treated kaolin was then dried in an oven at 100 degrees centigrade overnight. A charge of 212 grams of acrolein (97 percent pure), 300 grams pentaerythritol, and 15.4 grams (3 percent of the total charge) of the kaolin treated as above was placed in a reaction flask equipped with stirrer, thermometer and reflux condenser. After heating for 8 hours the kettle temperature did not rise above 52 degrees centigrade (the boiling point of acrolein) and the pentaerythritol remained unreacted. It was concluded that the treated kaolin was of no value as a catalyst for the reaction.

Experiment 2

This experiment describes an attempt to make an active catalyst by acid-treating so-called "Molecular Sieves." These materials are a synthetic zeolite produced and sold by Linde Air Products Co. A charge of 100 grams of "Molecular Sieves" (14 x 30 mesh) 150 cc. of water and 35 grams of concentrated sulfuric acid was charged to a reaction flask. Steam was sparged through this mixture for 6 hours and the solid was then filtered out. It was washed with distilled water until the pH of the wash water was 4.5.

A charge of 212 grams of acrolein (97 percent pure), 300 grams of pentaerythritol, and 15.4 grams (3 percent of the total charge) of the acid-treated "Molecular Sieves" was placed in the reactor described in Experiment 1. The material was heated for 8 hours with no reaction occurring as evidenced by the boiling point of the solution and the failures of the pentaerythritol to go into solution. It was concluded that the treated "Molecular Sieves" were of no value as a catalyst for the reaction.

We claim:

1. A process for forming synthetic liquid resins of low viscosity which comprises the steps of heating to reaction temperature, in contact with a catalytic amount of an acid-treated sub-bentonite clay catalyst, a mixture of pentaerythritol and from about 1.3 to about 2 moles of an alpha,beta-unsaturated aldehyde per mole of said pentaerythritol, and continuing the heating step at reaction temperature until the viscosity of the resulting liquid resinous reaction product when freed of solid and volatile material is in the range of from about 500 to about 5,000 centipoises when measured at a temperature of 25° C.

2. The process according to claim 1 wherein the alpha,beta-unsaturated aldehyde is an olefinic alpha,beta-unsaturated aldehyde having less than 8 carbon atoms.

3. The process according to claim 1 wherein the alpha,beta-unsaturated aldehyde is acrolein.

4. A process for forming synthetic resins having a low viscosity which comprises the steps of heating pentaerythritol to reaction temperature with an alpha,beta-unsaturated aldehyde in contact with a catalytic amount of an acid-treated sub-bentonite clay, wherein the molar ratio of said aldehyde reacted with the pentaerythritol varies from about 1.3 to 2 moles of said aldehyde per mole of pentaerythritol, continuing the heating step at reaction temperature until the viscosity of the resulting liquid resinous reaction product when freed of solid and volatile material is in the range of from 500 to 5,000 centipoises when measured at a temperature of 25° C., filtering the reaction product to remove solid particles and vacuum distilling the solids free reaction product to remove volatile matter from the resin.

5. The process of claim 4 wherein the alpha,beta-unsaturated aldehyde is an olefinic alpha,beta-unsaturated aldehyde having less than 8 carbon atoms.

6. The process of claim 4 wherein the aldehyde is acrolein.

7. The process for forming synthetic resins having a low viscosity which comprises the steps of heating pentaerythritol to reaction temperature with an olefinic alpha,beta-unsaturated aldehyde having less than 8 carbon atoms wherein the molar ratio of said aldehyde reacted with the pentaerythritol varies from about 1.3 to 2 moles of said aldehyde per mole of pentaerythritol in contact with a catalytic amount of an acid-treated sub-bentonite clay in an amount of 0.5 to 20 percent by weight of the total charge, continuing the heating step at reaction temperature until the viscosity of the resulting liquid resinous reaction product when freed of solid and volatile material is in the range of from 500 to 5,000 centipoises when measured at a temperature of 25° C., filtering the reaction product to remove solid matter and vacuum distilling the solids free resin to remove volatile matter in order to obtain a viscous resin suitable for storage and subsequent curing to a solid plastic.

8. The process of claim 7 wherein the viscosity of the solids and volatile-free resin is 500 to 4,000 centipoises when said viscosity is measured at a temperature of 25° C.

9. The process of claim 7 wherein the aldehyde is acrolein.

10. The process of claim 7 wherein the aldehyde is alpha-chloroacrolein.

11. The process of claim 7 wherein the aldehyde is crotonaldehyde.

12. The process of claim 7 wherein the aldehyde is alpha-methyl acrolein.

13. The process of claim 7 wherein the aldehyde is alpha-methyl crotonaldehyde.

14. A synthetic liquid resin of low viscosity comprising the reaction product formed by heating to reaction temperature, in contact with a catalytic amount of an acid-treated sub-bentonite clay catalyst, a mixture of pentaerythritol and acrolein in a proportion of from about 1.3 to about 2 moles of said pentaerythritol per mole of said acrolein, and continuing the heating step at reaction temperature until the viscosity of the resulting liquid resinous reaction product, when freed of solid and volatile material, is in the range of from about 500 to about 5,000 centipoises when measured at a temperature of 25° C.

References Cited in the file of this patent

UNITED STATES PATENTS

| | | |
|---|---|---|
| 2,401,776 | Rothrock | June 11, 1946 |
| 2,501,144 | Saunders | Mar. 21, 1950 |
| 2,556,312 | Young | June 12, 1951 |
| 2,660,572 | Feasley | Nov. 24, 1953 |
| 2,786,081 | Kress | Mar. 19, 1957 |

FOREIGN PATENTS

| | | |
|---|---|---|
| 717,418 | Great Britain | Oct. 27, 1954 |
| 870,032 | Germany | Mar. 9, 1953 |

OTHER REFERENCES

Schulz et al.: Angewandte Chemie, vol. 62, #5, March 1950, pages 105, 113–118.

UNITED STATES PATENT OFFICE
CERTIFICATION OF CORRECTION

Patent No. 2,972,601              February 21, 1961

Howard R. Guest et al.

It is hereby certified that error appears in the above numbered patent requiring correction and that the said Letters Patent should read as corrected below.

Column 8, lines 52 and 53, for "pentaerythritol per mole of said acrolein" read -- acrolein per mole of said pentaerythritol --.

Signed and sealed this 15th day of August 1961.

(SEAL)
Attest:

ERNEST W. SWIDER                          DAVID L. LADD

Attesting Officer                           Commissioner of Patents